United States Patent
Purpura

(10) Patent No.: US 9,771,001 B2
(45) Date of Patent: Sep. 26, 2017

(54) HYBRID ELECTRICALLY POWERED TRANSPORTATION SYSTEM UTILIZING RENEWABLE ENERGY STORED IN SUPERCAPACITORS

(71) Applicant: The Boeing Company, Chicago, IL (US)

(72) Inventor: William Joseph Purpura, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 475 days.

(21) Appl. No.: 14/510,782

(22) Filed: Oct. 9, 2014

(65) Prior Publication Data

US 2016/0101709 A1    Apr. 14, 2016

(51) Int. Cl.
 *B60M 3/00*    (2006.01)
(52) U.S. Cl.
 CPC ............ *B60M 3/00* (2013.01); *B60L 2200/26* (2013.01); *Y02T 90/16* (2013.01)
(58) Field of Classification Search
 CPC ............ B60M 3/00; B60M 3/02; B60M 3/06
 USPC ............................................ 191/2, 3, 4, 5, 6
 See application file for complete search history.

(56) References Cited

U.S. PATENT DOCUMENTS

| 5,148,898 | A  | * | 9/1992 | Musachio | ................ | B60M 1/30 180/2.1 |
| 8,684,150 | B2 | * | 4/2014 | Kumar | ..................... | B60M 3/00 104/289 |
| 2013/0175855 | A1 | * | 7/2013 | Lee | ........................... | B60L 7/16 307/9.1 |
| 2015/0008733 | A1 | * | 1/2015 | Periot | ....................... | B60L 7/14 307/9.1 |
| 2015/0027837 | A1 | * | 1/2015 | Lamba | ...................... | B60L 9/00 191/6 |
| 2015/0031306 | A1 | * | 1/2015 | Lundquist | ................ | H04B 3/60 455/66.1 |
| 2015/0274035 | A1 | * | 10/2015 | Hourtane | .................. | B60M 1/36 191/6 |
| 2016/0101709 | A1 | * | 4/2016 | Purpura | ................... | B60M 3/00 191/6 |
| 2016/0339785 | A1 | * | 11/2016 | Rumbak | ................. | B60L 5/005 |
| 2017/0088015 | A1 | * | 3/2017 | Flamanc | ................... | B60M 1/18 |

\* cited by examiner

*Primary Examiner* — Jason C Smith
(74) *Attorney, Agent, or Firm* — Thompson Hine LLP

(57) ABSTRACT

An electrical grid management system is disclosed, and includes a plurality of segmented pathways that each include a corresponding renewable energy source and a vehicle propelled along the plurality of segmented pathways. The electrical grid management system includes a system control module including control logic determining a baseline operational plan. The baseline operation plan is based on scheduling and operational requirements of the vehicle. The electrical grid management system also includes a corresponding supercapacitor provided for at least one of the plurality of segmented pathways. The supercapacitor stores energy generated by the corresponding renewable energy source for later use to propel the vehicle along a corresponding segmented pathway. The electrical grid management system includes a plurality of section control modules in communication with the system control module, the corresponding supercapacitor, and the main grid.

14 Claims, 3 Drawing Sheets

HYBRID ELECTRICALLY POWERED TRANSPORTATION SYSTEM UTILIZING RENEWABLE ENERGY STORED IN SUPERCAPACITORS

FIELD

The disclosed system relates to electrically powered transportation systems and, more particularly, to a hybrid electrically powered transportation system utilizing supercapacitors for storing renewable energy generated to augment main power supplied by a conventional power source.

BACKGROUND

Traditional or conventional power distribution systems may use energy sources such as, for example, gas, coal or oil. Other types of power generation systems may use renewable energy sources for providing power instead. Some examples of renewable energy systems include, but are not limited to, wind power systems, solar power systems, geothermal systems, hydrostatic power systems, and hydrokinetic power systems. However, renewable energy systems may be unpredictable when it comes to generating energy. For example, a solar power system is generally unable to generate power on cloudy days, or in the evening hours of the day. Moreover, wind powered systems are even less predictable and may be unable to provide power as well, depending on weather conditions.

Electrically powered transportation systems usually include a track or other pathway, where one or more vehicles may travel along the track. Electrically powered transportation systems may also include multiple injection points, where electrical power may be provided to the track at an injection point. Some examples of electrically powered transportation systems include high-speed electric trains, low-speed electric trains, people movers, smart highway systems, and canal transportation systems.

Some electrically powered transportation systems may attempt to use both conventional power sources as well as renewable energy sources for electrical energy. However, it may be challenging to combine a renewable energy source with a conventional energy source in an electrically powered transportation system. This is because it is usually not possible to predict exactly when power from the renewable energy source will be available. Moreover, analysis of the power generated by the renewable energy source may be complicated due to the variations in generated electrical power. Finally, the renewable power generated by these renewable energy systems is usually not sufficient and/or available to meet all of the power demands of a vehicle traversing between power injection points of the system at any time. Thus, conventional power sources (i.e., from the main grid) may be responsible for fulfilling all of the power demands of the vehicle in the event there is insufficient renewable power available. These issues may create significant challenges when attempting to manage power in an electrically powered transportation system. Thus, there is a continuing need in the art for an improved electrically powered transportation system that employs more predictable approaches for providing of renewable energy generated along an electrically powered transportation system.

SUMMARY

In one aspect, an electrical grid management system is disclosed, and includes a plurality of segmented pathways that each include a corresponding renewable energy source and a vehicle propelled along the plurality of segmented pathways. The electrical grid management system includes a system control module including control logic determining a baseline operational plan. The baseline operation plan is based on scheduling and operational requirements of the vehicle. The electrical grid management system also includes a corresponding supercapacitor provided for at least one of the plurality of segmented pathways. The supercapacitor stores energy generated by the corresponding renewable energy source for later use to propel the vehicle along a corresponding segmented pathway. The electrical grid management system includes a plurality of section control modules each in communication with the system control module, the corresponding supercapacitor, and the main grid. The section control modules each include control logic for drawing power from either the main grid or the corresponding supercapacitor to propel the vehicle along the segmented pathways based on the baseline operation plan.

In another aspect, a method of supplying power in an electrical grid management system is disclosed. The electrical grid management system may be connected to a main grid and includes a plurality of segmented pathways, a corresponding renewable energy source provided for each of the plurality of segmented pathways, and a vehicle propelled along the segmented pathways. The method includes determining a baseline operational plan by a system control module. The system control module is for overall operation of the electrical grid management system. The method includes sending the baseline operational plan to the plurality of section control modules over a data communication link. The plurality of section control modules each correspond to one of the segmented pathways. The method also includes instructing a high voltage AC section power integrator module to draw power from the main grid if a corresponding supercapacitor is below a minimum power level by one of the plurality of section control modules. The corresponding supercapacitor stores energy generated by the corresponding renewable energy source for later use to propel the vehicle along a corresponding segmented pathway.

Other objects and advantages of the disclosed method and system will be apparent from the following description, the accompanying drawings and the appended claims.

DETAILED DESCRIPTION

Figure 1:
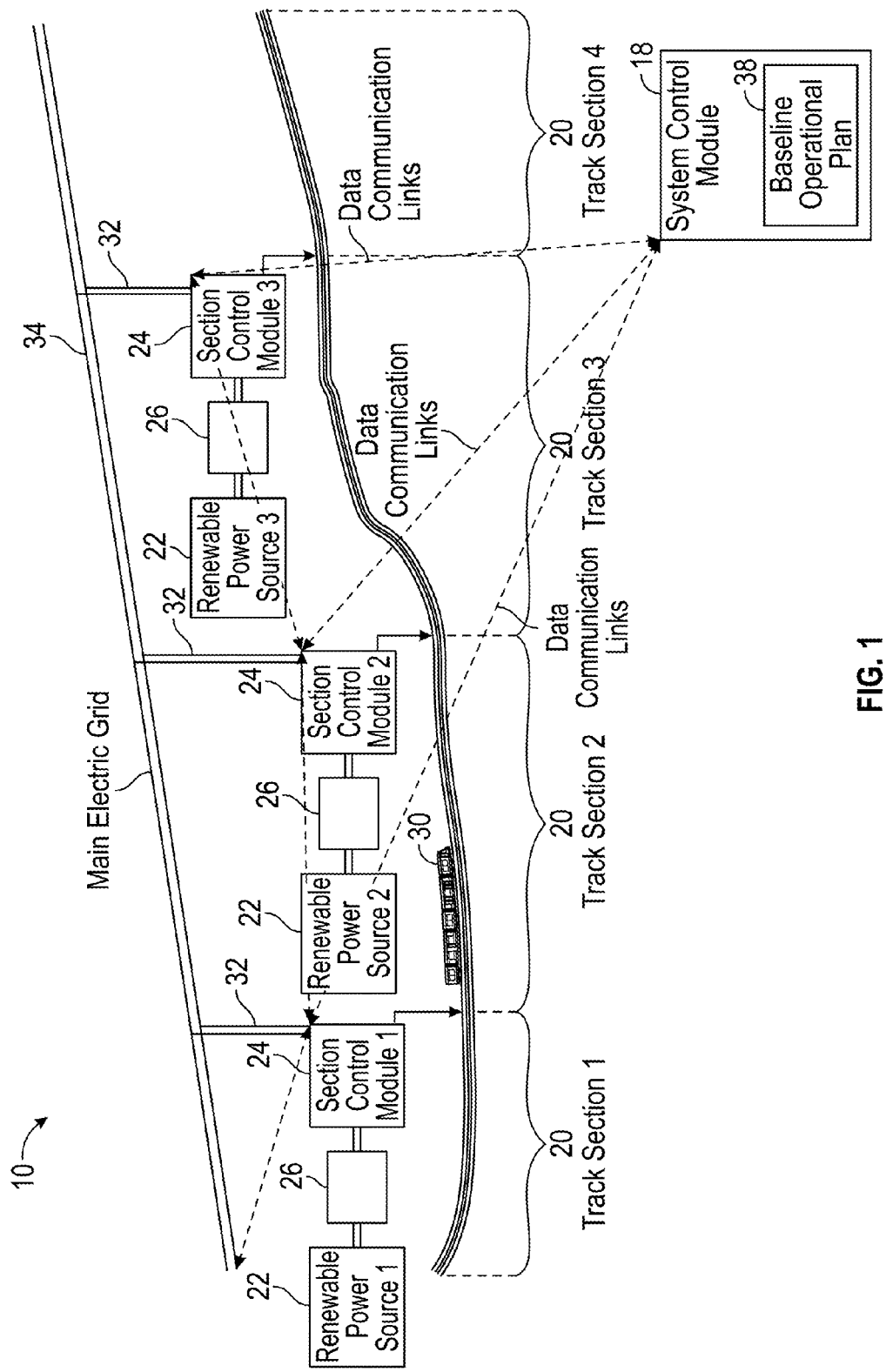
FIG. 1 is a schematic illustration of the disclosed hybrid electrically powered transportation system including a system control unit that manages electrical power to a plurality of track sections.

As shown in FIG. 1, the disclosed hybrid electrically powered transportation system 10 may include a system control module 18 that manages electrical power to a plurality of track segments or sections 20. In the non-limiting embodiment as shown in FIG. 1, four track sections 20 are shown, however those skilled in the art will readily appreciate that the electrically powered transportation system 10 may include any number of individual track sections. Each track section 20 may include a corresponding renewable energy source 22, a section control module 24, and an energy storage device such as a supercapacitor 26. The renewable energy sources 22 may be based on any type of energy source derived resources that may be naturally replenished. Some examples of renewable energy sources include, but are not limited to, wind power systems (e.g., windmills or wind turbines), solar power systems (e.g., photovoltaic solar cells or concentrated solar power), geothermal systems (i.e., surface and subsurface sources), hydrostatic power systems (i.e., dams, waterfalls, or gravity siphon recovery), or hydrokinetic power systems (i.e., wave action, river action, and canal current action).

In one embodiment, each section of track 20 may use a renewable energy source 22 that is appropriate or suitable for the specific geographical area of the track 20. In other words, the type or kind of renewable energy source 22 may be based on the climate that the specific track section 20 is located within, and/or the availability of geographical features such as a water drop, or a fast-moving river. For example, if the first track section 1 extends through a desert, then the renewable energy source 22 may be a solar power system. Alternatively, if the track section 1 extends through or is adjacent to a river, then the renewable energy source 22 may be a hydrostatic power system or a hydrokinetic power system. Those skilled in the art will readily appreciate that the supercapacitors 26 may be situated locally within the same track section 20 where the renewable energy is generated. Thus, the renewable energy generated within a respective section 20, may be stored locally in a supercapacitor 26 that is also located within the same respective section 20. The renewable energy therefore does not need to be transmitted over relatively long distances, but may be generated, stored, and expended locally within a respective track section 20.

The electrically powered transportation system 10 may be any type of system for transporting one or more vehicles 30 along a segmented series of pathways. In the non-limiting embodiment as illustrated in the figures and described below, the vehicle 30 may be either a high-speed electric train or a low-speed electric train that travels along the segmented series of track sections 20. The track sections 20 may each be modular rail sections transported by railway, truck, airlift, or airdrop for rapid installation or in field repair. However it is to be understood that the electrically powered transportation system 10 may also be, for example, a people mover, a smart highway system, or a canal transportation system. Moreover, those skilled in the art will readily appreciate that although railway tracks are illustrated in the figures, the track sections 20 may be any other pathway that allows for vehicles to travel therein such as, for example, a segmented series of roads for a smart highway system, or a series of canals.

The electrically powered transportation system 10 may also include a plurality of power access lines 32. Each of the power access lines 32 may connect a traditional or conventional energy source 34 to each section control module 24 and ultimately to each track section 20. The conventional energy source 34 may also be referred to as grid power or the main grid. Some examples of conventional energy sources 34 that the power access line 32 may be connected to include, but are not limited to, gas, coal or oil power plants. As explained in greater detail below, each track section 20 may obtain power from either the conventional energy source 34 (i.e. grid power) or, alternatively, from the corresponding renewable energy source 22 to propel the vehicle 30 along the track section 20 based on the operating conditions that impact a baseline operational plan 38 of the electrically powered transportation system 10. The baseline operational plan 38 of the electrically powered transportation system 10 includes various information regarding the travel of the vehicle 30, and is described in greater detail below. In one embodiment, the supercapacitor 26 may be used to provide power to the vehicle 30 in order to propel the vehicle 30 to the next track section 20 in the event there is a complete loss of grid power. Specifically, in the event that there is no power being supplied to the track section 20 from the conventional power source 34, the electrically powered transportation system 10 may extract energy from a local supercapacitor 26 to enable the train operating within the same track section 20 and the supercapacitor 26, to operate in a creep mode e.g. to move a reduced speed, which allows for the vehicle 30 to reach the next track section 20, or to a safe pull-off point area until power being supplied to the grid from the conventional energy source 34 is restored.

The supercapacitors 26 may each be in communication with the corresponding renewable energy source 22 and the section control modules 24. The supercapacitors 26 used to store energy generated by the corresponding renewable energy source 22. For example, the supercapacitor 26 associated with the first track section 1 may store energy generated by the renewable energy source 22 associated with the first track section 1. In one embodiment, the corresponding renewable energy source 22 and the supercapacitor 26 may not be provided to each and every track section 20. Instead, the renewable energy source 22 and the supercapacitor 26 may only be applied to the track sections 20 where utilization of stored renewable energy is determined to be cost effective.

In one exemplary embodiment, the supercapacitors 26 are graphene supercapacitors. Graphene supercapacitors allow for a higher power density when compared to some other types of supercapacitors. Moreover, graphene supercapacitors may also possess relatively long lifetimes (typically more than ten years), high cycle efficiency (e.g., 95% or more), and do not generally include corrosive electrolytes. Moreover, those skilled in the art will readily appreciate that supercapacitors in general may be charged and discharged relatively quickly when compared to traditional battery technologies due to the supercapacitor's relatively low internal resistance.

Continuing to refer to FIG. 1, the system control module 18 is in communication with each of the section control modules 24 using any available data communication technology (i.e., master-to-node communication links). Some examples of available data communication links include, but are not limited to, radio frequency (RF) communication, microwave communication, cable links, or lasers. Moreover, the section control modules 24 may be in communication with one another as well (i.e., node-to-node communication links). Specifically, as shown in FIG. 1, the first section control module 1 may be in communication with a second section control module 2. The second section control module 2 may be in communication with a third section control module 3.

Figure 2:
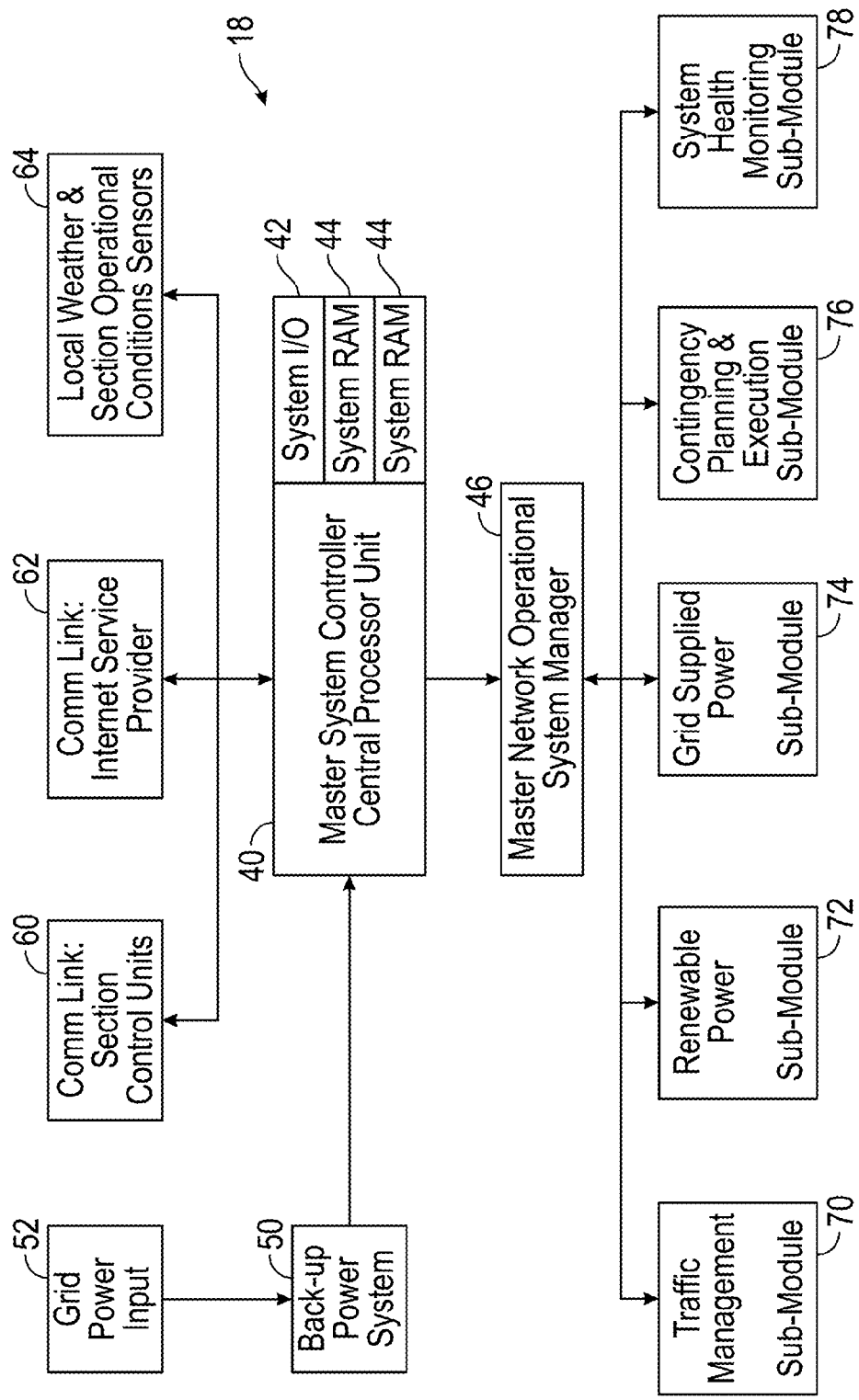
FIG. 2 is a schematic diagram of the system control module shown in FIG. 1, where the system control module includes a plurality of sub-modules for operation of the electrically powered transportation system.

FIG. 2 is a schematic diagram illustrating the functional architecture of the control module 18. The control module 18 may refer to, or be part of, an application specific integrated circuit (ASIC), an electronic circuit, a combinational logic circuit, a field programmable gate array (FPGA), a processor (shared, dedicated, or group) that executes code, or a combination of some or all of the above, such as in a system-on-chip. The control module 18 may include a central processing unit (CPU) 40, a system I/O 42, one or more units of random-access memory (RAM) 44, and an operational system manager module 46. The control module 18 may also include a back-up power system 50. The back-up power system 50 may be in communication with a grid power input 52, which is connected to and draws power from the main grid.

The CPU 40 may also be in communication with a first communication link 60, a second communication link 62, and one or more weather and section operational conditions sensors 64. Specifically, the first communications link 60 may connect the control module 18 with each of the section control modules 24 (shown in FIG. 1). The second communications link 62 may connect the control module 18 with an internet service provider (ISP) that provides services for accessing, using, or participating in the Internet.

The weather and section operational conditions sensors 64 may include one or more sensors for determining various weather conditions and supplying the CPU 40 with the weather data required to monitor the health, performance, and operational status of the electrically powered transportation system 10. Some examples of weather sensors include, but are not limited to, wind speed, wind direction, sunlight emitted from the sun, rainfall, barometric pressure, temperature and relative humidity at the site of the control module 18. Additionally, in one embodiment, the weather and section operational conditions sensors 64 may include data transmitted from local weather services. The data may include weather predictions that the control module 18 may use to project near-term renewable power generation capability. For example, if the data indicates that there will be a storm tomorrow, then the control module 18 may determine that solar power may not be available tomorrow.

In the exemplary embodiment, the operational system manager module 46 is configured to manage the overall operation and management of the electrically powered transportation system 10 (FIG. 1). Specifically, as explained below, the master network operational system manager module 46 may send the baseline operational plan 38 to each of the section control modules 24 (shown in FIG. 1). The baseline operational plan 38 may include information such as the expected time of arrival of the vehicle 30 (FIG. 1) to the specific track section 20 and the probable or predicted load of the vehicle 30 on the specific track section 20. For example, referring to FIG. 1, the baseline operational plan 38 may indicate that the vehicle 30 arrives at the first track section 1 at 1 pm on a specific day, and arrives at the second track section 2 at 2:45 pm on the same day.

It should be noted that each of the section control modules 24 may also determine their own individual operational plans based on the weather and operating conditions of their own section of track 20. If any of the individual operation plans conflict with the baseline operational plan 38 determined by the master network operational system manage module 46, then the individual section control module 24 may communicate with the master network operational system manager module 46 in order to modify the baseline operational plan 38 as well as the individual operation plans accordingly.

Referring to both FIGS. 1 and 2, the master network operational system manager module 46 may include a plurality of sub-modules that handle various operational aspects of the electrically powered transportation system 10. Specifically, the master network operational system manager module 46 may include a traffic management sub-module 70, a renewable power sub-module 72, a grid supplier sub-module 74, a contingency planning and execution sub-module 76, and a system health monitoring sub-module 78. The master network operational system manager module 46 may include control logic for coordinating and arbitrating between the various sub-modules 70, 72, 74, 76, and 78 in an effort to provide efficient, cost-effective resource allocation based on current operating conditions of the electrically powered transportation system 10.

The traffic management sub-module 70 includes control logic for managing the operational flow of the vehicle 30 (FIG. 1) along the track sections 20 of the electrically powered transportation system 10. Specifically, the traffic management sub-module 70 may determine efficient vehicle loads and vehicle routes for one or more vehicles 30 along the track 20 based on the time of day, available power supplies, current weather conditions, and regulatory requirements.

The renewable power sub-module 72 includes control logic for determining the manner which renewable power is generated, a specific amount of renewable power generated that is actually generated, and how the renewable power that is generated is stored. Specifically, the renewable power sub-module 72 may determine efficient consumption of generated renewable power based on the amount of renewable power available, time of planned use of the renewable power, the cost of renewable power versus grid power, regulatory and environmental impacts, weather conditions, vehicle loads, route dynamics, and status of the main grid. The status of the main grid is a combination of the current power supply from the main grid and any projected system conditions. The current power supply from the main grid indicates whether the main grid is operational, as well as how much electrical power is currently being produced by the main grid. Some examples of projected system conditions include, for example, expected system outages, unexpected system loads that are currently approaching, and the comparative cost of grid power provided at the present time versus some other time during system operation.

The grid supplier sub-module 74 includes control logic for developing baseline utilization profiles for power supplied by the main grid. The baseline utilization factor may represent the typical or usual operational energy utilization plan under normal operating conditions for a specific season (e.g., winter, summer, spring or fall). The baseline utilization profiles may be determined based on current economic factors (i.e., the cost of grid power) as well as whether the renewable energy sources 22 are operating at less than expected or predicts capacity. For example, if any of the renewable energy sources 22 along the track 20 operate a lower than expected output, or if the cost of conventional energy from the main grid has increased, these factors may affect the baseline utilization profiles.

The grid supplier sub-module 74 includes control logic to communicate with the renewable power sub-module 72 in order to develop the baseline operational plan 38 (illustrated in FIG. 1). The baseline operational plan 38 may be determined based on scheduling and operational requirements of the vehicle 30. For example, the baseline operational plan 38 may be based on factors such as a known or published standardized travel schedule of various routes of the vehicle 30, standardized rolling stock and their operational requirements (i.e., the operational requirements of the vehicle 30 on the track), and estimated loading of each dispatched vehicle being controlled. The baseline operational plan 38 may be sent to the master network operational system manager module 46. As mentioned above, the baseline operational plan 38 may include information such as the expected time of arrival of the vehicle 30 to a specific track section 20 based on average operational conditions expected for the day.

The contingency planning and execution sub-module 76 includes control logic for performing analysis and trade studies in order to develop contingency plans for mitigating various system malfunctions. The analysis and trade studies may be performed on a specific component or components located within the specific section of track 20 of the electrically powered transportation system 10. Alternatively, in another embodiment, the analysis and trade studies may be based on all of the track sections 20. The contingency plans may mitigate potential system impacts due to unexpected financial, regulatory, environmental, or political factors which may impact the performance of the electrically powered transportation system 10.

Finally, the system health monitoring sub-module 78 includes control logic for real-time monitoring and reporting of factors that may impact vehicle or system safety, regulatory compliance, or system business model optimization. Some examples of factors that may impact system health include changes in operational conditions of a component within the section of track 20, or regulatory directives that may limit the availability of some types of energy. For example, in one embodiment the change in operational conditions may be detecting an increase in component temperature before the component overheats. Those skilled in the art will readily understand that each of the sub-modules 70, 72, 74, 76, and 78 may share data with one another as well as with the master network operational system manager module 46.

Figure 3:
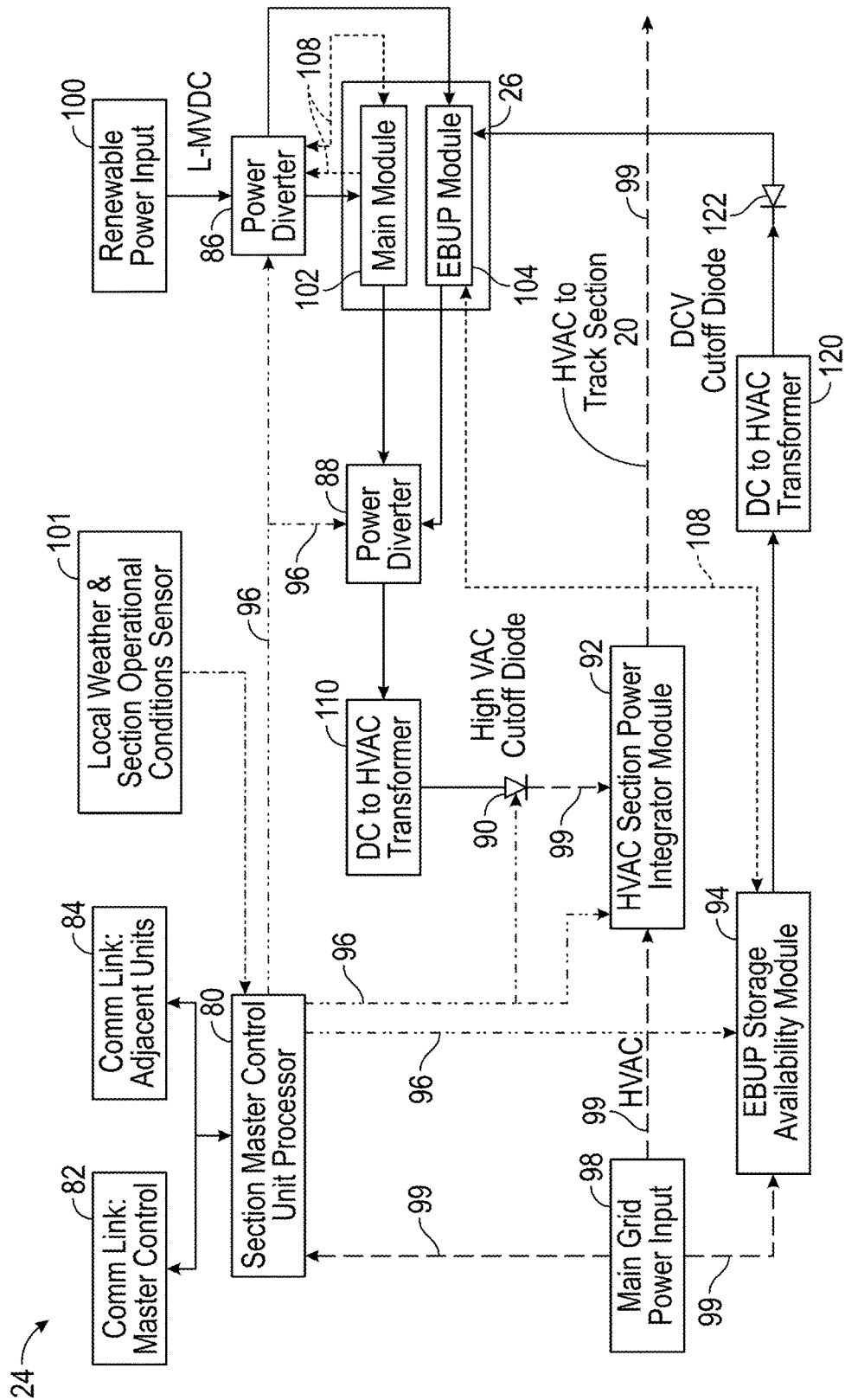
FIG. 3 is a functional schematic diagram of one section control module and a corresponding supercapacitor shown in FIG. 1, as well as various power, sensor, and control electronics used to power to a single one of the track sections.

FIG. 3 is a functional schematic diagram of one of the section control modules 24 and the corresponding supercapacitor 26 shown in FIG. 1. As seen in FIG. 3, the supercapacitor 26 may be composed of a supercapacitor main module 102 and an emergency back-up power (EBUP) module 104. Additionally, FIG. 3 also illustrates various power, sensor, and control electronics used to deliver electrical power to a corresponding track section 20. The section control module 24 may include a section master control unit processor 80, which includes control logic for determining control and communication functions that allow for the section control module 24 to meet operational mission requirements. Referring to both FIGS. 1 and 3, the section master control unit processor 80 may receive the baseline operational plan 38 from the system control module 18. The section control module 24 may include control logic for determining how electrical power is supplied a corresponding section of the track 20 once the vehicle 30 arrives. The section control module 24 obtains the estimated arrival time, within a specific section, of the vehicle 30 based on the information contained in the baseline operational plan 38.

The section control module 24 may provide power obtained from either the corresponding supercapacitor main module 102 or the main grid to propel the vehicle 30 along the corresponding section of track 20 until the vehicle 30 reaches an adjacent section of track 20. Specifically, the section control module 24 generally utilizes power from the corresponding supercapacitor main module 102 to propel the vehicle 30 until the vehicle 30 reaches an adjacent section of track 20, or if the supercapacitor 26 runs out of stored energy. If the supercapacitor 26 runs out of stored energy, power may be drawn from the main grid to propel the vehicle 30.

In some embodiments, the section control module 24 may draw power from the main grid instead of from the corresponding supercapacitor 26 depending on the operational plan and mission requirements of the electrically powered transportation system 10. Specifically, the section control module 24 may determine that the power should not be drawn from the corresponding supercapacitor 26 until a later time. For example, in one embodiment the section control module 24 may determine or receives instructions that indicate the cost of grid power as the vehicle 30 the vehicle 30 arrives at the corresponding section of track 20 is less than the cost of renewable energy being generated by the renewable energy source 22 located within the section of track 20. In fact, the cost of grid power may increase later that day and will eventually exceed the cost of the renewable power. Thus, the energy stored in the supercapacitor 26 may be conserved for later use during the day. Alternatively, in another approach, the section control module 24 may determine based on the operational plan that a future event will occur where grid power may not be available (e.g., a known power outage, etc.). Thus, energy stored in the supercapacitor 26 may be conserved for later use, when grid power may not be available.

As seen in FIG. 3, the section master control unit processor 80 may be in signal communication by a digital control link 96 with a first communication link 82, a second communication link 84, a first power diverter 86, a second power diverter 88, a high voltage AC (VAC) cutoff diode 90, a high voltage AC (HVAC) section power integrator module 92, and an emergency back-up power (EBUP) availability module 94. The section master control unit processor 80 may be in communication with a main grid power input 98 through a high voltage AC (HVAC) line 99. The section master control unit processor 80 may also be in signal communication with weather and section operational conditions sensors 101. Those skilled in the art will readily appreciate that although the illustration shown in FIG. 3 illustrates AC power being used to propel the vehicle 30 (FIG. 1), in an alternative embodiment DC power may be used instead for vehicle propulsion where the power electronics and circuitry may be modified accordingly to account for the DC power.

The power diverter 86 may be in signal communication with the supercapacitor main module 102 by one or more voltage sensor lines 108. Specifically, sensors (not illustrated) may monitor the charge levels of the supercapacitor main module 102 and send the information over the voltage sensor line 108 to the power diverter 108. The voltage sensor line 108 may also connect the EBUP availability module 94 to the supercapacitor EBUP module 104. Thus, the EBUP availability module 94 may monitor the charge level of the supercapacitor EBUP module 104 as well.

The main grid power input 98 may include a step-down transformer (not shown). The main grid power input 98 may be used to connect the section master control unit processor 80, the HVAC section power integrator module 92, and the EBUP availability module 94 with the main grid (not shown).

The first communications link 82 may connect the section master control unit processor 80 with the system control module 18 (shown in FIG. 1) using any available data communication technology. The second communication link 84 may connect the section master control unit processor 80 with adjacent section control modules (shown in FIG. 1) also using any available data communication approach. For example, referring to FIG. 1, the second communication link 84 may connect the first section control module 24 with the second section control module 24. As explained above, the data communication links may be, for example, RF communication, microwave communication, cable links, or lasers.

Referring to both FIGS. 1 and 3, the first communications link 82 may send the baseline operational plan 38 determined by the system control module 18 to the section master control unit processor 80. As explained above, the baseline operational plan 38 may include information such as the expected time of arrival of the vehicle 30 to the specific track section 20. The second communications link 84 may send information regarding adjacent track sections 20 to the section master control unit processor 80. For example, the second communications link 84 may send information regarding the current operating conditions of the vehicle 30 (e.g., if a train running early or late, etc.)

The first power diverter 86 may be in communication with the renewable energy source 22 (FIG. 1) and the supercapacitor 26. The first power diverter 86 may be used to control the flow of power from the renewable energy source 22 to the supercapacitor 26. Specifically, the first power diverter 86 may be in communication with a renewable power input 100, which is part of the renewable energy source 22 (FIG. 1). The first power diverter 86 may be used to control the flow of direct current (DC) power generated by the renewable power input 100 to either a supercapacitor main module 102, or to a supercapacitor EBUP module 104 based on instructions from the section master control unit processor 80.

The supercapacitor main module 102 and the supercapacitor EBUP module 104 may both be part of the supercapacitor 26. Specifically, the supercapacitor main module 102 may be used to store DC power generated by the renewable energy source 22 for later use. The supercapacitor EBUP module 104 may be used to store DC power generated by the renewable energy source 22. Alternatively, the supercapacitor EBUP module 104 may be used to store converted high voltage AC obtained from the main grid. The supercapacitor EBUP module 104 stores a sufficient amount of energy in order to allow for the vehicle 30 (FIG. 1) to reach the next track section 20 where more power may be available, or to a safe pull-off point area during creep mode.

The supercapacitor main module 102 and the supercapacitor EBUP module 104 may both be in communication with the second power diverter 88. The second power diverter 88 may also be in communication with a DC to HVAC transformer 110. The second power diverter 88 may be used to control the flow of stored DC current in the supercapacitor main module 102 and the supercapacitor EBUP module 104 to the DC to HVAC transformer 110 based on instructions from the section unit master control processor 80. In particular, the unit master control processor 80 may instruct the second power diverter 88 to draw power from the supercapacitor EBUP module 104 in the event there is a loss of power from the main grid.

The DC to HVAC transformer 110 may be used to convert DC power from the supercapacitor 26 into high voltage AC current. The high voltage AC current may be used to power the corresponding track section 20 of the electrically powered transportation system 10 (FIG. 1). The DC to HVAC transformer 110 may be in communication with the HVAC section power integrator module 92 through the VAC cutoff diode 90. The VAC cutoff diode 90 may be used to shut off the flow of high voltage AC from the DC to HVAC transformer 110 to the HVAC section power integrator module 92 if the voltage supplied from the supercapacitor main module 102 drops below a minimum value required for operation of the vehicle 30 (FIG. 1). In the event the current drops below the minimum value, then the HVAC section power integrator module 92 may draw power from the main grid through the main grid power input 98. The minimum value may be based on transformer manufacturer specifications as well as the motor specifications of the vehicle 30 (i.e., the motor specifications of the train). For example, if solar power is stored at +12 VDC, then the minimum value may be any voltage value below 11.5 VDC.

The section master control unit processor 80 may also include control logic for instructing the HVAC section power integrator module 92 to draw power from the main grid depending on the operational plan of the electrically powered transportation system 10. Specifically, sometimes power should not be drawn from the supercapacitor 26 until a later time. For example, in one embodiment the cost of grid power as the vehicle 30 arrives at the corresponding section of track 20 may be less than the cost of renewable energy. Thus, the section master control unit processor 80 may instruct the HVAC section power integrator module 92 to draw power from the main grid. Alternatively, in another approach, the section master control unit processor 80 may determine or is sent information indicating a future event will occur where grid power may not be available (e.g., a known power outage, etc.). Thus, the section master control unit processor 80 may instruct the HVAC section power integrator module 92 to draw power from the main grid.

Referring to both FIGS. 1 and 3, the HVAC section power integrator module 92 may be in communication with a corresponding track section 30 (shown in FIG. 1). The HVAC section power integrator module 92 may be used to transmit the power needed to propel the vehicle 30 along the respective track section 20.

The EBUP storage availability module 94 may be in communication with the main grid power input 98 through the HVAC line 99. The EBUP storage availability module 94 may be used to monitor the supercapacitor EBUP module 104. Specifically, the EBUP storage availability module 94 may include control logic for monitoring a charge level of the supercapacitor EBUP module 104, and draws high voltage AC current from the main grid power input 98 for charging the supercapacitor EBUP module 104 if a charge level of the EBUP storage availability module 94 falls below a specific amount. In one embodiment, the specific amount of charge may be about 100% capacity. This ensures that the supercapacitor EBUP module 104 always has the necessary level of charge in order to propel the vehicle 30 (FIG. 1) during creep mode. An HVAC to DC transformer 120 may be used to convert the high voltage AC current from the main grid into the DC power needed by the supercapacitor EBUP module 104.

The HVAC to DC transformer 120 may be in communication with the supercapacitor EBUP module 104 and the EBUP storage availability module 94. A DC voltage diode 122 may be used to detect the charge level of the supercapacitor EBUP module 104. When the supercapacitor EBUP module 104 reaches the maximum storage level (i.e., 100% capacity), the DC voltage diode 122 may stop the flow of power from the HVAC to DC transformer 120 to the supercapacitor EBUP module 104. Also, a signal may be sent to the section master control unit processor 80 indicating the supercapacitor EBUP module 104 has reached the maximum storage level. Once the section master control unit processor 80 receives the signal, the section master control unit processor 80 may send a shut-off signal to the EBUP storage availability module 94 to stop drawing high voltage AC current from the main grid power input 98.

Referring generally to the figures, the disclosed electrically powered transportation system may provide a reliable, cost-effective approach for integrating renewable energy sources with grid power. Some electrically powered transportation systems currently available may utilize both conventional power sources as well as renewable energy sources for propelling a vehicle. However, it may be challenging to combine a renewable energy source with a conventional energy source together, since it is usually not possible to predict exactly when power from the renewable energy source will be available. In contrast, the disclosed supercapacitor provides a predictable approach for supplying renewable power to a specific track section. Moreover, each section of track may use a renewable energy source that is appropriate for the geographical area (i.e., solar power for a track located in the desert, etc.). Thus, renewable energy may be stored and utilized locally where the renewable energy is generated, rather than transmitting the renewable energy over long distances.

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. An electrical grid management system connected to a main grid, the electrical grid management system including a plurality of segmented pathways that each include a corresponding renewable energy source, the electrical grid management system comprising:
   a system control module including control logic determining a baseline operational plan, wherein the baseline operation plan is based on scheduling and operational requirements of a vehicle propelled along the plurality of segmented pathways;
   a corresponding supercapacitor provided for at least one of the plurality of segmented pathways, the corresponding supercapacitor storing energy generated by one of the corresponding renewable energy source for later use to propel the vehicle along a corresponding segmented pathway; and
   a plurality of section control modules in communication with the system control module, one of the corresponding supercapacitors, and the main grid, the plurality of section control modules each including control logic for drawing power from either the main grid or the corresponding supercapacitor to propel the vehicle along the segmented pathways based on the baseline operation plan.

2. The electrical grid management system of claim 1, comprising a corresponding high voltage AC section power integrator module in communication with one of the plurality of section control modules.

3. The electrical grid management system of claim 2, wherein the plurality of section master control modules each include control logic for instructing the corresponding high voltage AC section power integrator module to draw power from the main grid if the corresponding supercapacitor is below a minimum power level.

4. The electrical grid management system of claim 2, wherein the plurality of section master control modules each include control logic for instructing the corresponding high voltage AC section power integrator module to draw power from the main grid if a cost of grid power as the vehicle arrives at a corresponding segmented pathway is less than a cost of renewable energy.

5. The electrical grid management system of claim 1, wherein the baseline operational plan includes an expected time of arrival of the vehicle to a specific segmented pathway and a probable load impact of the vehicle.

6. The electrical grid management system of claim 1, wherein the corresponding supercapacitors each include a supercapacitor main module and an emergency back-up power (EBUP) supercapacitor module.

7. The electrical grid management system of claim 6, wherein the supercapacitor main module stores DC power generated by one of the corresponding renewable energy sources.

8. The electrical grid management system of claim 6, wherein the EPUB supercapacitor module stores either converted high voltage AC obtained from the main grid or DC power generated by one of the corresponding renewable energy sources.

9. The electrical grid management system of claim 6, wherein the EBUP supercapacitor module stores a sufficient amount of converted high voltage AC obtained from the main grid in order to allow for the vehicle to reach an adjacent segmented pathway or a safe pull-off point area during creep mode.

10. The electrical grid management system of claim 6, comprising an EPUB storage availability module for monitoring a charge level of the EPUB supercapacitor module, wherein the EPUB storage availability module draws high voltage AC current from the main grid for charging the EPUB supercapacitor module if the charge level falls below a specified amount.

11. The electrical grid management system of claim 1, wherein the corresponding supercapacitors are graphene supercapacitors.

12. The electrical grid management system of claim 1, wherein the plurality of segmented pathways comprise of one of: railway tracks, roads, and canals.

13. The electrical grid management system of claim 1, wherein the electrical grid management system is selected from the group consisting of: a high-speed electric train, a low-speed electric train, a people mover, a smart highway system, and a canal transportation system.

14. The electrical grid management system of claim 1, wherein the corresponding renewable energy sources are selected from the group consisting of: wind power systems, solar power systems, geothermal systems, hydrostatic power systems, and hydrokinetic power systems.

* * * * *